(12) United States Patent
Zeng et al.

(10) Patent No.: US 11,173,433 B2
(45) Date of Patent: Nov. 16, 2021

(54) SERVICE LIFE REMINDING SYSTEM FOR WATER BOTTLE FILTER ELEMENT

(71) Applicant: Shenzhen Shenlan Electric Appliance Co., LTD, Shenzhen (CN)

(72) Inventors: Tianxiong Zeng, Shenzhen (CN); Weifu Guo, Shenzhen (CN); Shiyi Zhang, Shenzhen (CN)

(73) Assignee: SHENZHEN SHENLAN ELECTRIC APPLIANCE CO., LTD, Shenzhen (CN)

( * ) Notice: Subject to any disclaimer, the term of this patent is extended or adjusted under 35 U.S.C. 154(b) by 0 days.

(21) Appl. No.: 17/145,425

(22) Filed: Jan. 11, 2021

(65) Prior Publication Data

US 2021/0146285 A1 May 20, 2021

Related U.S. Application Data

(63) Continuation of application No. PCT/CN2019/125068, filed on Dec. 13, 2019.

(30) Foreign Application Priority Data

Nov. 20, 2019 (CN) .......................... 201911143110.2

(51) Int. Cl.
*B01D 35/143* (2006.01)
*A45F 3/16* (2006.01)

(52) U.S. Cl.
CPC ............ *B01D 35/1435* (2013.01); *A45F 3/16* (2013.01); *A45F 2003/163* (2013.01)

(58) Field of Classification Search
CPC . A45F 2003/163; A45F 3/16; B01D 35/1435; B01D 27/101; B01D 27/103;

(Continued)

(56) References Cited

U.S. PATENT DOCUMENTS 4,498,495 A * 2/1985 Worwood ............ B01D 35/143
                                                        137/557
7,258,781 B2 * 8/2007 Warren .................. C02F 1/003
                                                        210/87

(Continued)

FOREIGN PATENT DOCUMENTS

CN         203043717 U       7/2013
CN         204617935 U       9/2015

(Continued)

OTHER PUBLICATIONS

International Search Report for PCT/CN2019/125068.
Written Opinion of the International Search Authority for PCT/CN2019/125068.

*Primary Examiner* — Terry K Cecil

(57) ABSTRACT

The present disclosure provides a service life reminding system for a water bottle filter element. The service life reminding system for the water bottle filter element includes a one-way valve head, a mounting bracket, and a circuit board. The mounting bracket includes a first accommodating cavity. A portion of the one-way valve head is movably accommodated in the first accommodating cavity. A magnetic element is fixed in the mounting bracket. A magnetic sensor is arranged on the circuit board. Both of the circuit board and the magnetic sensor are accommodated in the one-way valve head. When the one-way valve head slides to abut against the mounting bracket, the magnetic sensor senses the magnetic element. When the one-way valve head slides away from the mounting bracket until the one-way valve head separates from the mounting bracket, the magnetic sensor is unable to sense the magnetic element.

10 Claims, 4 Drawing Sheets

(58) Field of Classification Search
CPC .. B01D 27/108; B01D 35/143; B01D 35/157; B01D 35/1573; C02F 2209/445; C02F 2307/02; C02F 2307/04
USPC .......................................... 210/91, 117, 136
See application file for complete search history.

(56) References Cited

U.S. PATENT DOCUMENTS

| | | | |
|---|---|---|---|
| 9,359,224 B2* | 6/2016 | Senninger | ............ B01D 35/147 |
| 2016/0046421 A1 | 2/2016 | Brown | |

FOREIGN PATENT DOCUMENTS

| | | |
|---|---|---|
| CN | 106859203 A | 6/2017 |
| CN | 206692443 U | 12/2017 |
| CN | 208574327 U | 3/2019 |
| WO | WO 0066245 A1 | 11/2000 |

* cited by examiner

SERVICE LIFE REMINDING SYSTEM FOR WATER BOTTLE FILTER ELEMENT

TECHNICAL FIELD

The present disclosure relates to a field of water purification, and in particular to a service life reminding system for a water bottle filter element.

BACKGROUND

With improvement of living standards, people have higher and higher requirements for water quality, a water purification bottle that a user is able to carry is very popular. The water purification bottle filters water through a filter element disposed inside. A service life of the filter element is fixed. A conventional water purification bottle is unable to count the number of uses of the filter element, and it is impossible to judge whether the filter element needs to be replaced. The user is only able to judge whether the filter element needs to be replaced according to the approximate use time, which is very inaccurate. Once the filter element is used more than the specified number of times, the filter element not only fails to purify the water, but also contaminates the water.

SUMMARY

In order to solve above problems, the present disclosure provides a service life reminding system for a water bottle filter element.

The present disclosure is realized by following technical solutions.

The present disclosure provides a service life reminding system for a water bottle filter element including a one-way valve head, a mounting bracket, and a circuit board. The mounting bracket comprises a first accommodating cavity. A portion of the one-way valve head is movably accommodated in the first accommodating cavity. A magnetic element is fixed in the mounting bracket. A magnetic sensor is arranged on the circuit board. Both of the circuit board and the magnetic sensor are accommodated in the one-way valve head. When the one-way valve head slides to abut against the mounting bracket, the magnetic sensor senses the magnetic element. When the one-way valve head slides away from the mounting bracket until the one-way valve head separates from the mounting bracket, the magnetic sensor is unable to sense the magnetic element.

Furthermore, the service life reminding system for the water bottle filter element further comprises a light emitting diode (LED) bead fixedly arranged on the one-way valve head. The LED bead is electrically connected with the circuit board.

Furthermore, a battery is arranged on the circuit board, and the battery is accommodated in the one-way valve head.

Furthermore, the service life reminding system for the water bottle filter element further comprises a filter element fixing bracket. A second accommodating cavity communicated with the first accommodating cavity is arranged in the filter element fixing bracket. The mounting bracket is accommodated in the second accommodating cavity and is fixedly connected to the filter element fixing bracket.

Furthermore, the service life reminding system for the water bottle filter element further comprises an elastic element. The elastic element is accommodated in the second accommodating cavity. One end of the elastic element is fixedly connected to the filter element fixing bracket. Another end of the elastic element is fixedly connected to the one-way valve head.

Furthermore, the service life reminding system for the water bottle filter element further comprises the water bottle filter element. The filter element fixing bracket comprises a third accommodating cavity communicated with the second accommodating cavity. The water bottle filter element is fixedly installed in the third accommodating cavity.

Furthermore, a first waterproof ring is arranged between the filter element fixing bracket and the mounting bracket.

Furthermore, the service life reminding system for the water bottle filter element further comprises a main body. The filter element fixing bracket is fixedly arranged on a bottom portion of the main body.

Furthermore, the main body comprises a fourth accommodating cavity. Water passage holes are on the filter element fixing bracket. The water passage holes are communicated with the fourth accommodating cavity, and the water passage holes are communicated with the second accommodating cavity.

Furthermore, a second waterproof ring is arranged between the main body and the filter element fixing bracket.

The service life reminding system for the water bottle filter element of the present disclosure counts use times of the water bottle filter element by sensing the magnetic element with the magnetic sensor. When a use time of the water bottle filter element is within a predetermined use time, the LED bead emits green light. When the use time of the filter element exceed the predetermined use time, the LED bead emits red light.

DETAILED DESCRIPTION

In order to describe technical solutions of the present disclosure clearly and completely, the present disclosure will be further described below with reference to the accompanying drawings.

Figure 1:
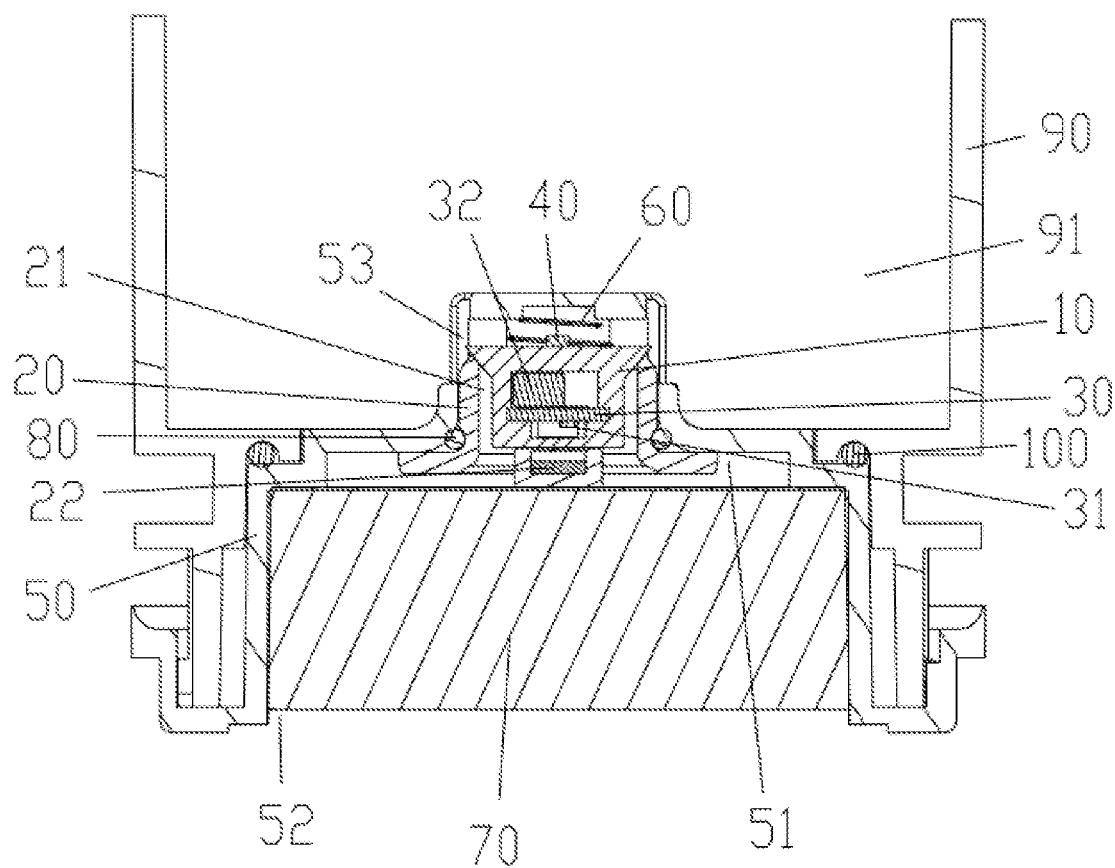
FIG. 1 is a cross-sectional schematic diagram of a service life reminding system for a water bottle filter element of the present disclosure.
Figure 2:
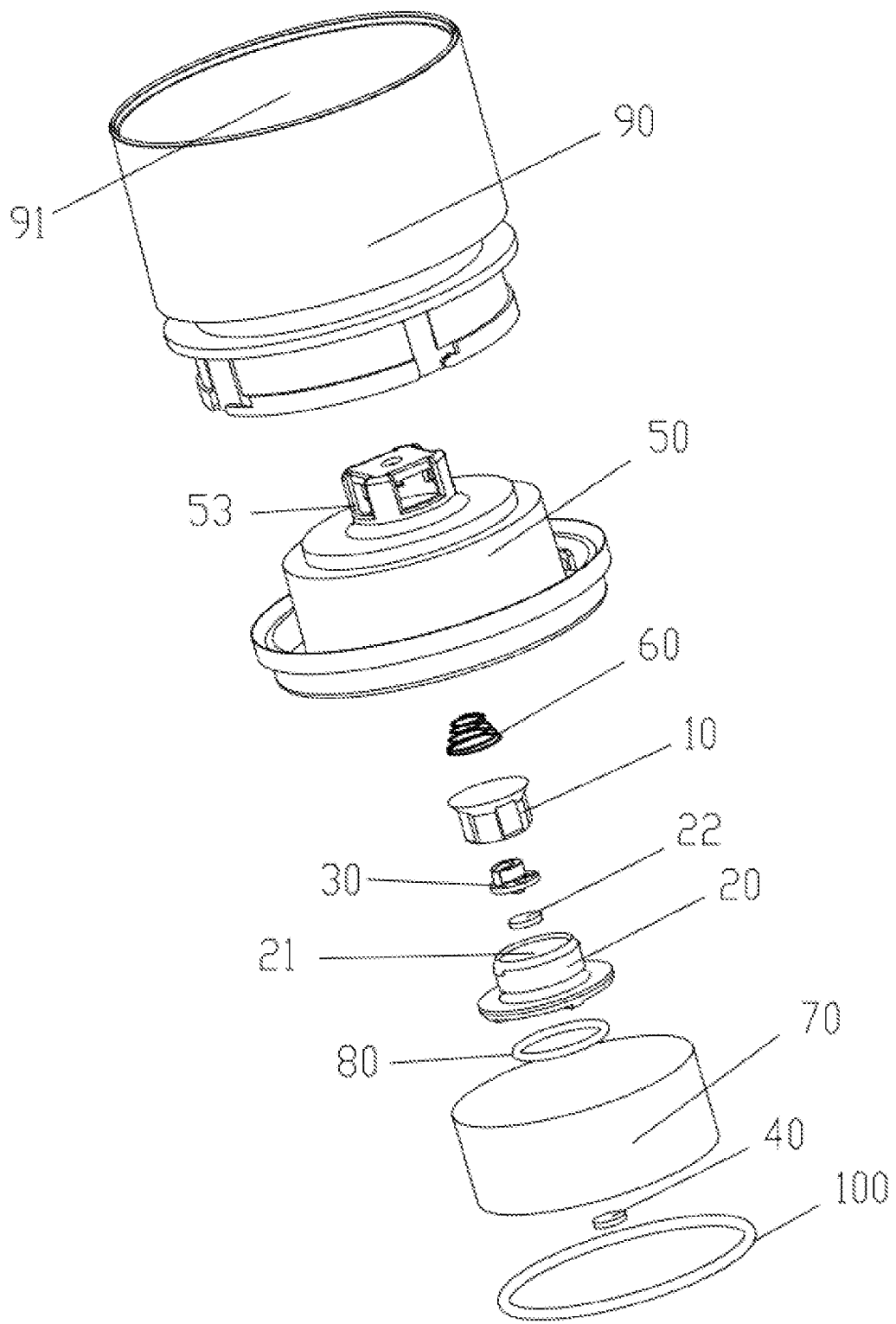
FIG. 2 is an exploded schematic diagram of the service life reminding system for the water bottle filter element of the present disclosure.
Figure 3:
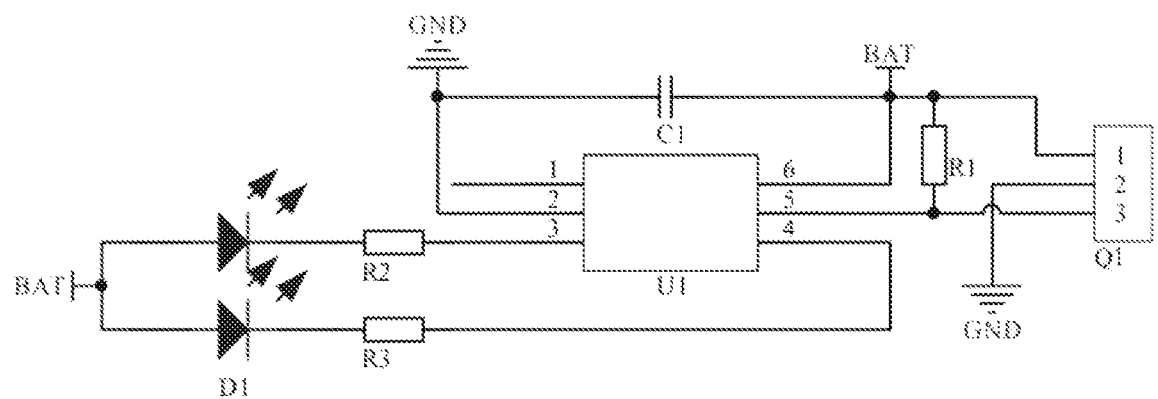
FIG. 3 is a circuit schematic diagram of the service life reminding system for the water bottle filter element of the present disclosure.
Figure 4:
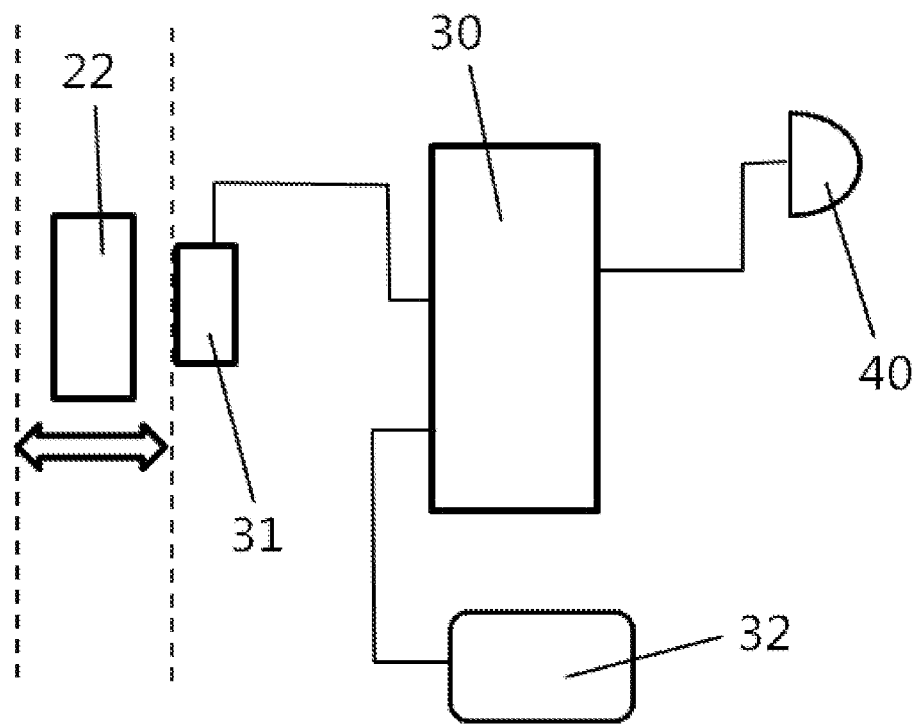
FIG. 4 is a schematic diagram showing a principle of the service life reminding system for the water bottle filter element of the present disclosure.

As shown in FIGS. 1-4, The present disclosure provides a service life reminding system for a water bottle filter element 70. The service life reminding system for the water bottle filter element 70 comprises a one-way valve head 10, a mounting bracket 20, and a circuit board 30. The mounting bracket 20 comprises a first accommodating cavity 21. A portion of the one-way valve head 10 is movably accommodated in the first accommodating cavity 21. A magnetic element 22 is fixed in the mounting bracket 20. A magnetic sensor 31 is arranged on the circuit board. Both the circuit board 30 and the magnetic sensor 31 are accommodated in the one-way valve head 10. When the one-way valve head 10 slides to abut against the mounting bracket 20, the magnetic sensor 31 senses the magnetic element 22. When the one-way valve head 10 slides away from the mounting bracket 20 until the one-way valve head 10 separates from the mounting bracket 20, the magnetic sensor 31 is unable to sense the magnetic element 22.

In the embodiment, the magnetic sensor 31 is electrically connected with the circuit board 30. The portion of the one-way valve head 10 is movably accommodated in the first accommodating cavity 21. so that the one-way valve head 10 is able to slide in the first accommodating cavity 21. The circuit board 30 and the magnetic sensor 31 are accommodated in the one-way valve head 10, and external water, dust, etc., are unable to enter the one-way valve head 10. When the one-way valve head 10 abuts against the mounting bracket 20, the one-way valve head 10 blocks the first accommodating cavity 21. There is no gap between the one-way valve head 10 and the mounting bracket 20, so that liquid cannot pass through the one-way valve head 10 to flow into the first accommodating cavity 21.

Furthermore, the service life reminding system for the water bottle filter element 70 further comprises a light emitting diode (LED) bead 40 fixedly arranged on the one-way valve head 10. The LED bead 40 is electrically connected with the circuit board.

In the embodiment, When the one-way valve head 10 slides to abut against the mounting bracket 20, the magnetic sensor 31 senses the magnetic element 22, and the LED bead 40 does not emit light. When the one-way valve head 10 slides away from the mounting bracket 20 until the one-way valve head 10 separates from the mounting bracket 20, the magnetic sensor 31 is unable to sense the magnetic element 22 and the LED bead 40 emit light.

Furthermore, a battery 32 is arranged on the circuit board 30, and the battery 32 is accommodated in the one-way valve head 10.

In the embodiment, the battery 32 is electrically connected with the circuit board 30, and the battery 32 provides electrical energy for the circuit board 30.

Furthermore, the service life reminding system for the water bottle filter element 70 further comprises a filter element fixing bracket 50. A second accommodating cavity 51 communicated with the first accommodating cavity 21 is arranged in the filter element fixing bracket 50. The mounting bracket 20 is accommodated in the second accommodating cavity 51 and is fixedly connected to the filter element fixing bracket 50. The service life reminding system for the water bottle filter element 70 further comprises an elastic element 60. The elastic element 60 is accommodated in the second accommodating cavity 51. One end of the elastic element 60 is fixedly connected to the filter element fixing bracket 50. Another end of the elastic element 60 is fixedly connected to the one-way valve head 10.

In the embodiment, the elastic element 60 is a non-metal spring. There is no gap between the filter element fixing bracket 50 and the mounting bracket 20. Under elastic action of the elastic element 60, the one-way valve head 10 abuts against the mounting bracket 20

Furthermore, the service life reminding system for the water bottle filter element 70 further comprises the water bottle filter element 70. The filter element fixing bracket 50 comprises a third accommodating cavity 52 communicated with the second accommodating cavity 51. The water bottle filter element 70 is fixedly installed in the third accommodating cavity 52.

In the embodiment, the water enters the second accommodating cavity 51 after being filtered by the water bottle filter element 70 and then enters the first accommodating cavity 21.

Furthermore, a first waterproof ring 80 is arranged between the filter element fixing bracket 50 and the mounting bracket 20.

In the embodiment, the first waterproof ring 80 seals a gap between the filter element fixing bracket 50 and the mounting bracket 20, such that the external liquid cannot enter the second accommodating cavity 51 through the gap between the filter element fixing bracket 50 and the mounting bracket 20.

Furthermore, the service life reminding system for the water bottle filter element 70 further comprises a main body 90. The filter element fixing bracket 50 is fixedly arranged on a bottom portion of the main body 90. The main body comprises a fourth accommodating cavity 91. Water passage holes 53 are on the filter element fixing bracket 50. The water passage holes 53 are communicated with the fourth accommodating cavity 91, and the water passage holes 53 are communicated with the second accommodating cavity 51.

In the embodiment, the fourth accommodating cavity 91 is configured to store the water filtered by the water bottle filter element 70. The filter element fixing bracket 50 is partially received in the fourth accommodating cavity 91. The external water enters the second accommodating cavity 51 after being filtered by the water bottle filter element 70, and then enters the first accommodating cavity 21, When the water fills the first accommodating cavity 21, the water lifts the one-way valve head 10 to make the one-way valve head 10 move away from the mounting bracket 20. When the one-way valve head 10 separates from the mounting bracket 20, and the elastic element 60 is compressed. At this time, the magnetic sensor 31 is unable to sense the magnetic element 22, and the LED bead 40 emits light, indicating that the water bottle filter element 70 is working. The water passing through the first accommodating cavity 21 enters the fourth accommodating cavity 91 through the water passage holes 53. When there is no water to lift up the one-way valve head 10, the elastic element 60 stretches and recovers. Under the elastic action of the elastic element 60, the one-way valve head 10 slides to abuts against the mounting bracket 20, so that the magnetic sensor 31 senses the magnetic element 22, and the LED bead 40 does not emit light, indicating that the water bottle filter element 70 has completed a filtering task. At this time, the water in the fourth accommodating cavity 91 cannot flow into the first accommodating cavity 21 through the one-way valve head 10, and under action of the water pressure, the mounting bracket 20 abuts against the one-way valve head 10.

The circuit board 30 counts the number of operations of the water bottle filter element 70. The circuit board 30 comprises a microprocessor. Whenever the magnetic sensor 31 senses the magnetic element 22, the LED bead 40 is turned off, which indicates that the water bottle filter element 70 completes one filtering task. Then, the circuit board 30 records it once. The specified use times of the water bottle filter element 70 is wrote into the circuit board 30 in advance. When the number of use times of the water bottle filter element 70 is within the predetermined number of use times and the magnetic sensor 31 is unable to sense the magnetic element 22, the circuit board 30 controls the LED bead 40 to emit green light. When the use time of the water bottle filter element 70 exceeds the predetermined number of use times and the magnetic sensor 31 is unable to sense the magnetic element 22, the circuit board 30 controls the LED bead 40 to emit red light to remind a user to replace the water bottle filter element 70.

Furthermore, a second waterproof ring 100 is arranged between the main body 90 and the filter element fixing bracket 50.

In the embodiment, the second waterproof ring 100 seals a gap between the main body 90 and the filter element fixing bracket 50, so that the water in the fourth accommodating cavity 91 cannot pass the gap between the main body 90 and the filter element fixing bracket 50 to enter the second accommodating cavity 51.

Of course, the present invention can also have many other embodiments. Based on this embodiment, other embodiments obtained by a person of ordinary skill in the art without any creative work are within the protection scope of the present invention.

What is claimed is:

1. A service life reminding system for a water bottle filter element, comprising: a one-way valve head, a mounting bracket, and a circuit board; wherein the mounting bracket comprises a first accommodating cavity, a portion of the one-way valve head is movably accommodated in the first accommodating cavity; a magnetic element is fixed in the mounting bracket, a magnetic sensor is arranged on the circuit board; both the circuit board and the magnetic sensor are accommodated in the one-way valve head; when the one-way valve head slides to abut against the mounting bracket, the magnetic sensor senses the magnetic element; when the one-way valve head slides away from the mounting bracket until the one-way valve head separates from the mounting bracket, the magnetic sensor is unable to sense the magnetic element; wherein the circuit board is configured to indicate a service life condition of the water bottle filter element.

2. The service life reminding system for the water bottle filter element according to claim 1, wherein the service life reminding system for the water bottle filter element further comprises a light emitting diode (LED) bead fixedly arranged on the one-way valve head; the LED bead is electrically connected with the circuit board.

3. The service life reminding system for the water bottle filter element according to claim 1, wherein a battery is arranged on the circuit board, and the battery is accommodated in the one-way valve head.

4. The service life reminding system for the water bottle filter element according to claim 1, wherein the service life reminding system for the water bottle filter element further comprises a filter element fixing bracket, a second accommodating cavity communicated with the first accommodating cavity is arranged in the filter element fixing bracket; the mounting bracket is accommodated in the second accommodating cavity and is fixedly connected to the filter element fixing bracket.

5. The service life reminding system for the water bottle filter element according to claim 4, wherein the service life reminding system for the water bottle filter element further comprises an elastic element; the elastic element is accommodated in the second accommodating cavity; one end of the elastic element is fixedly connected to the filter element fixing bracket; another end of the elastic element is fixedly connected to the one-way valve head.

6. The service life reminding system for the water bottle filter element according to claim 4, wherein the service life reminding system for the water bottle filter element further comprises the water bottle filter element; the filter element fixing bracket comprises a third accommodating cavity communicated with the second accommodating cavity; the water bottle filter element is fixedly installed in the third accommodating cavity.

7. The service life reminding system for the water bottle filter element according to claim 6, wherein a first waterproof ring is arranged between the filter element fixing bracket and the mounting bracket.

8. The service life reminding system for the water bottle filter element according to claim 7, wherein the service life reminding system for the water bottle filter element further comprises a main body; the filter element fixing bracket is fixedly arranged on a bottom portion of the main body.

9. The service life reminding system for the water bottle filter element according to claim 8, wherein the main body comprises a fourth accommodating cavity; water passage holes are on the filter element fixing bracket; the water passage holes are communicated with the fourth accommodating cavity; and the water passage holes are communicated with the second accommodating cavity.

10. The service life reminding system for the water bottle filter element according to claim 8, wherein a second waterproof ring is arranged between the main body and the filter element fixing bracket.

\* \* \* \* \*